United States Patent
He et al.

(10) Patent No.: US 10,939,122 B2
(45) Date of Patent: *Mar. 2, 2021

(54) MODIFIED CODING FOR TRANSFORM SKIPPING

(71) Applicant: Velos Media, LLC, Plano, TX (US)

(72) Inventors: Dake He, Waterloo (CA); Jing Wang, Waterloo (CA); Gaelle Christine Martin-Cocher, Toronto (CA)

(73) Assignee: Velos Media, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,222

(22) Filed: Jan. 31, 2020

(65) Prior Publication Data

US 2020/0169737 A1 May 28, 2020

Related U.S. Application Data

(63) Continuation of application No. 16/286,554, filed on Feb. 26, 2019, now Pat. No. 10,595,024, which is a continuation of application No. 13/533,337, filed on Jun. 26, 2012, now Pat. No. 10,257,520.

(51) Int. Cl.
*H04N 19/157* (2014.01)
*H04N 19/176* (2014.01)
*H04N 19/122* (2014.01)
*H04N 19/136* (2014.01)

(52) U.S. Cl.
CPC ......... *H04N 19/157* (2014.11); *H04N 19/122* (2014.11); *H04N 19/136* (2014.11); *H04N 19/176* (2014.11)

(58) Field of Classification Search
CPC .. H04N 19/176; H04N 19/157; H04N 19/136; H04N 19/122

USPC .................................................... 375/240.03
See application file for complete search history.

(56) References Cited

U.S. PATENT DOCUMENTS 6,505,299 B1 1/2003 Zeng
2013/0128966 A1 5/2013 Gao

OTHER PUBLICATIONS

Lan, C., et al., "Intra and inter coding tools for screen contents", JCTCV-E145, Mar. 10, 2011.
Mrak, Marta, et al., Transform Skip Mode, JCT-VC of ITU-T SG16 WP3 and ISO/IEC JTC1/SC29/WG11, 7th Meeting: Geneva, CH, Nov. 21-30, 2011.
Narroschke, et al., "Extending H.264/AVC by an adaptive coding of the prediction error", 25. Picture Coding Symposium; Apr. 24, 2006-Apr. 26, 2006; Beijing, Apr. 24, 2006, XP030080297.
Gao, et al., "Near Lossless Coding for Screen Content", 6. JCT-VC Meeting; 97 MPEG Meeting; Jul. 14, 2001-Jul. 22, 2011; Torino; No. JCTVC-F564, Jul. 2, 2011, XP030009587.
European Office Action received in European Application No. 12173938.7, dated Nov. 3, 2015.

(Continued)

*Primary Examiner* — On S Mung
(74) *Attorney, Agent, or Firm* — Spencer C. Patterson; Grable Martin Fulton PLLC (57) ABSTRACT

Methods and devices for modified coding of blocks of residuals in the case of transform skipping. To better align the data with assumptions upon which the entropy coding scheme is based, the block of residual data is permuted at the encoder prior to entropy coding. The block of reconstructed data is then inverse permuted at the decoder to recover the reconstructed block of residuals. The permutation may include 180 rotation of the block, which may be of particular benefit in the case of intra-coded residuals.

12 Claims, 7 Drawing Sheets

(56) References Cited

OTHER PUBLICATIONS

Antoine Robert, et al., "Improviding Intra Mode Coding in H.264/AVC Through Block Oriented Transforms", 2006 IEEE 8th Workshop on Multimedia Signal Processing, pp. 382-386.
European Office Action received in European Application No. 12173938.7, dated Jan. 30, 2015.
Lan, et al., "Intra Transform Skipping", JCTVC-I0408, Joint Collaborative Team on Video Coding (JCT-VC).

MODIFIED CODING FOR TRANSFORM SKIPPING

RELATED APPLICATION

This application is a continuation of U.S. application Ser. No. 16/286,554 filed Feb. 26, 2019, which is a continuation of U.S. application Ser. No. 13/533,337 filed Jun. 26, 2012, now U.S. Pat. No. 10,257,520, which are incorporated herein by reference in its entirety.

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever

FIELD

The present application generally relates to data compression and, in particular, to methods and devices for video coding that apply transform skipping to some blocks of residuals, and to an improved coding and decoding process to improve performance when transform skipping is enabled.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU termed High Efficiency Video Coding (HEVC). The initiative may eventually result in a video-coding standard that will form part of a suite of standards referred to as MPEG-H.

There are a number of standards for encoding/decoding images and videos, including H.264, that use block-based coding processes. In these processes, the image or frame is divided into blocks, typically 4×4 or 8×8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction). It is expected that HEVC will also have these features.

When spectrally transforming residual data, many of these standards prescribe the use of a discrete cosine transform (DCT) or some variant thereon. The resulting DCT coefficients are then quantized using a quantizer to produce quantized transform domain coefficients, or indices.

The block or matrix of quantized transform domain coefficients (sometimes referred to as a "transform unit") is then entropy encoded using a particular context model. In H.264/AVC and in the current development work for HEVC, the quantized transform coefficients are encoded by (a) encoding a last significant coefficient position indicating the location of the last non-zero coefficient in the transform unit, (b) encoding a significance map indicating the positions in the transform unit (other than the last significant coefficient position) that contain non-zero coefficients, (c) encoding the magnitudes of the non-zero coefficients, and (d) encoding the signs of the non-zero coefficients. This encoding of the quantized transform coefficients often occupies 30-80% of the encoded data in the bitstream.

The developing HEVC standard may provide for transform skipping in the case of intra-coded blocks. Transform skipping may be selectively applied in some cases. For example, it may be used in an attempt to improve rate-distortion performance in the case of mixed (screen) content video. In some cases, transform skipping may be applied to all intra-coded blocks/slices/frames/pictures. In some cases, it may be applied to certain categories of video data, such as only 4×4 intra-coded blocks.

When the transform step is skipped, the residual data left after the prediction operation is directly quantized and entropy encoded. In other words, the encoder and decoder do not deal with quantized transform domain coefficients, but rather with quantized spatial domain data (i.e. quantized residuals).

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present application describes methods and encoders/decoders for encoding and decoding residual video data.

In a first aspect, the present application describes a method of decoding a bitstream of encoded video in a video decoder to reconstruct a block of residuals. The method includes determining that transform skipping is enabled for the block of residuals; entropy decoding a part of the bitstream to reconstruct a permuted block of quantized residual data; and based on the determination that transform skipping is enabled, reconstructing the block of residuals by dequantizing and inverse permuting the permuted block of quantized residual data.

In another aspect, the present application discloses a method of encoding video in a video encoder to output a bitstream of encoded data, the video including a block of residuals. The method includes determining that transform skipping is enabled for the block of residuals; based on the determination that transform skipping is enabled, permuting the block of residual data to produce a permuted block of residual data; quantizing the permuted block of residual data to produce a permuted block of quantized residual data; and entropy encoding the permuted block of quantized residual data to generate part of the bitstream of encoded data.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264 standard for video coding and/or the developing HEVC standard. Those ordinarily skilled in the art will understand that the present application is not limited to H.264/AVC or HEVC but may be applicable to other video coding/decoding standards, including possible future standards, multi-view coding standards, scalable video coding standards, and reconfigurable video coding standards.

In the description that follows, when referring to video or images the terms frame, picture, slice, tile and rectangular slice group may be used somewhat interchangeably. Those of skill in the art will appreciate that, in the case of the H.264 standard, a frame may contain one or more slices. The term "frame" may be replaced with "picture" in HEVC. Other terms may be used in other video coding standards. It will also be appreciated that certain encoding/decoding operations might be performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to transform units, coding units, groups of coding units, etc., as will become apparent in light of the description below.

Figure 1:
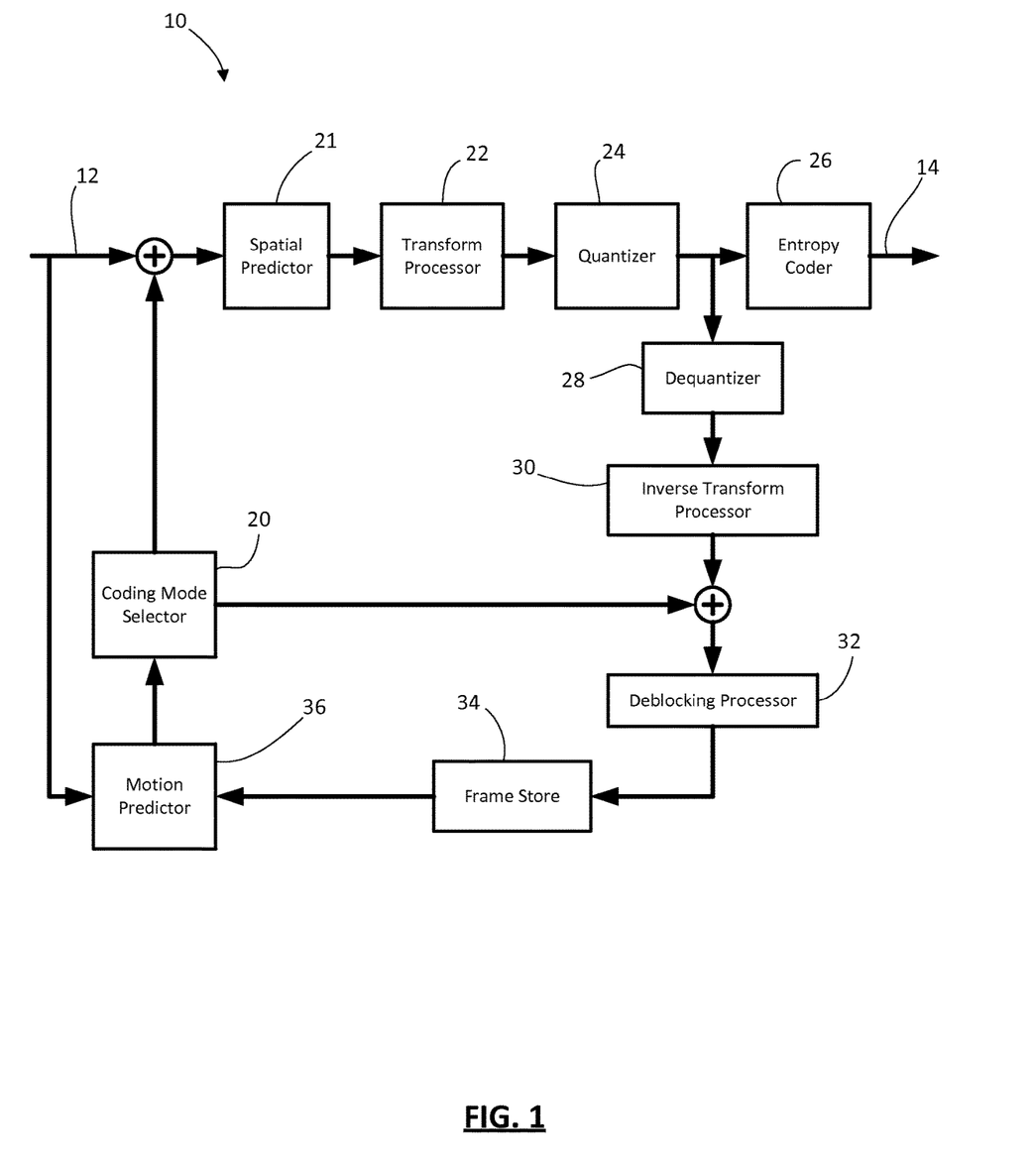
FIG. 1 shows, in block diagram form, an encoder for encoding video.
Figure 2:
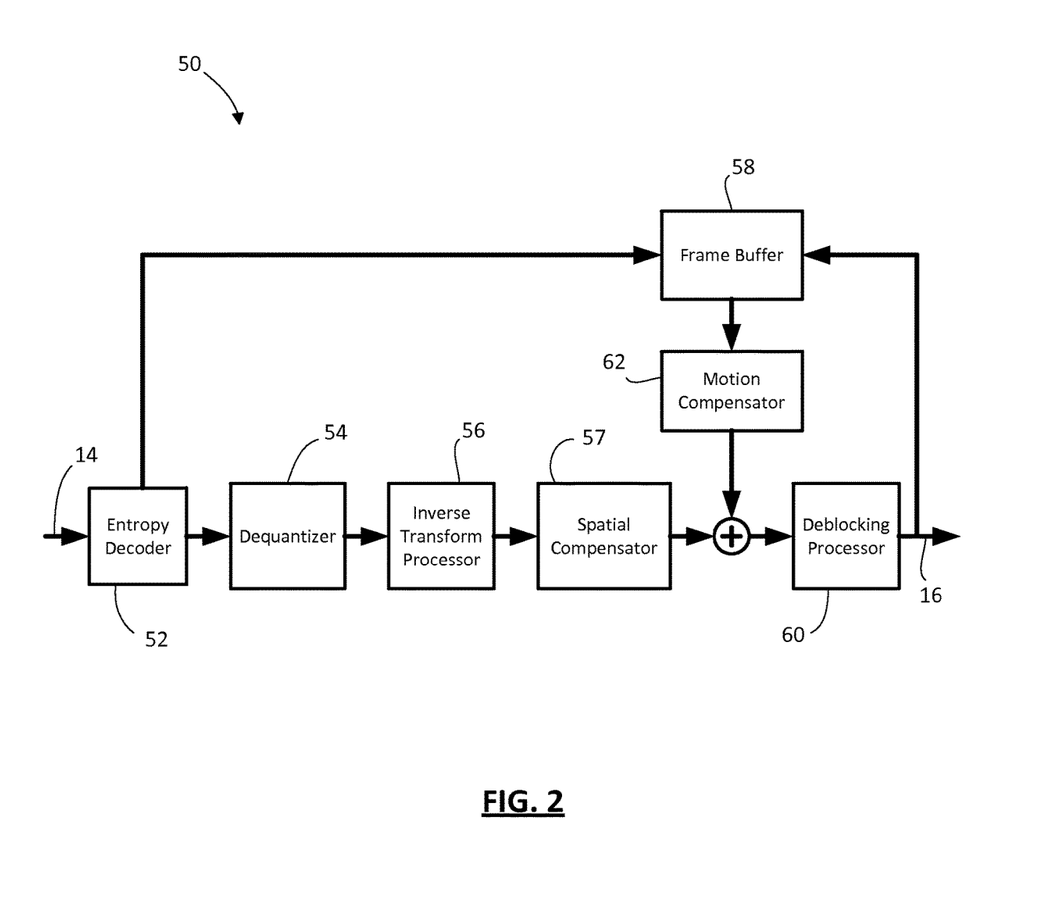
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, like HEVC.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units (e.g. macroblocks, coding units, etc.) within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform or others may be used in some instances. The block-based transform is performed on a coding unit, macroblock or sub-block basis, depending on the size of the macroblocks or coding units. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. In some cases, a 16×16 macroblock may include a non-overlapping combination of 4×4 and 8×8 transform blocks.

Applying the block-based transform to a block of pixel data results in a set of transform domain coefficients. A "set" in this context is an ordered set in which the coefficients have coefficient positions. In some instances the set of transform domain coefficients may be considered as a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

The block or matrix of quantized transform domain coefficients may be referred to herein as a "transform unit" (TU). In some cases, the TU may be non-square, e.g. a non-square quadrature transform (NSQT).

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. The deblocking processor 32 may include a deblocking processor and a filtering processor. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks or coding units to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing video encoders.

The decoder 50 includes an entropy decoder 52, dequantizer 54, inverse transform processor 56, spatial compensator 57, and deblocking processor 60. The deblocking processor 60 may include deblocking and filtering processors. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock or coding unit, the recreated "video data" is the residual data for use in spatial compensation relative to a previously decoded block within the frame. The spatial compensator 57 generates the video data from the residual data and pixel data from a previously decoded block. In other cases, such as inter-coded macroblocks or coding units, the recreated "video data" from the inverse transform processor 56 is the residual data for use in motion compensation relative to a reference block from a different frame. Both spatial and motion compensation may be referred to herein as "prediction operations".

The motion compensator 62 locates a reference block within the frame buffer 58 specified for a particular inter-coded macroblock or coding unit. It does so based on the reference frame information and motion vector specified for the inter-coded macroblock or coding unit. It then supplies the reference block pixel data for combination with the residual data to arrive at the reconstructed video data for that coding unit/macroblock.

A deblocking/filtering process may then be applied to a reconstructed frame/slice, as indicated by the deblocking processor 60. After deblocking/filtering, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

It is expected that HEVC-compliant encoders and decoders will have many of these same or similar features.

One feature that HEVC may include is transform skipping. Other video coding standards may also provide for the possibility of transform skipping, at least with respect to some blocks of residual data. In HEVC, transform skipping is currently considered in the case of intra-coded 4×4 blocks, although in other standards or in modification of HEVC it is possible that transform skipping may be applied to intra-coded blocks of other size, or even to inter-coded blocks. Transform skipping may also occur in HEVC in lossless mode, which is signaled by the "transquantbypass" flag. In lossless mode, both the transform and the quantization are skipped (in some implementations the quantization operation is still performed but it is flat quantization).

Transform skipping is a coding technique in which residual data is not subjected to a spectral transform, like DCT, that converts the residual data to transform coefficients. Instead, the residual data is directly quantized and entropy encoded (except in lossless mode, in which case the quantization is skipped too). At the decoder, if transform skipping is enabled for a block (which may be signaled by a flag in a header), then the decoder entropy decodes the quantized residuals and dequantizes them to produce reconstructed residual data. The encoding and decoding processes and models are unchanged from those used with quantized transform coefficients. That is, the encoder and decoder still code the coefficients/residuals using significance flags, greater-than-one flags, greater-than-two flags, remaining-level data, and sign bits, including techniques like parity hiding and sign bit hiding, where applicable and enabled.

Transform skipping has been enabled with respect to intra-coded 4×4 blocks in HEVC specifically because it may improve the BD-rate by 3-7% in certain sequences, like Class F sequences mixing screen content and natural video.

A problem noted by the present inventors is that transform skipping results in statistically different data distribution within a block than is the case with transform coefficients. This means that some of the assumptions upon which the entropy coding is based are no longer valid, which may negatively impact the efficiency of the entropy coding. In particular, in conventional video coding the effect of the spectral transform is to concentrate non-zero data in the upper left corner of the block. The higher frequency coefficients are concentrated in the right and lower portions of the block and statistically are less common, meaning that these portions of the block tend contain zero in many cases. The entropy coding is designed to take advantage of this by using a scan order that starts with the lower right corner and works back towards the upper left corner of the block (whether diagonal, zig zag, horizontal, or vertical). This means that the scan typically involves a large number of zeros at the beginning, followed by a concentration of non-zero data at the end, with the most likely non-zero position being the last position in the scan order. Many encoding techniques, including sign bit hiding and parity hiding, are based around this feature of current video coding.

In contrast, with transform skipping and intra-coded blocks, the statistics are different. With intra-coding, the predicted pixels are usually (depending on the mode) based on the pixels immediately above or to the left of the block being predicted. Thus, they are correlated most closely with the pixels along the upper row or leftmost column of the block. In other words, the most likely zero residuals are concentrated towards the upper end and left side of the block, whereas the most likely non-zero residuals are concentrated towards the bottom and right side of the block. This is not the statistical expectation upon which the entropy coding process is based.

One option to address this issue is to change the entropy coding process when transform skipping is enabled. For example, in one embodiment the encoder and decoder may have a second (alternative) scan order predefined that is the reverse of the scan order normally used. The second scan order may process residuals from the upper left corner towards the lower right corner and may otherwise use the entropy coding techniques of regular transform coefficient coding. This would address the issue of the statistically different distribution of data in the case of transform skipping.

Another option to address this issue is to permute a block of residual data prior to quantization and entropy coding, if transform skipping is enabled for the block. A suitably chosen permutation of the block to produce a permuted block of residual data may result in a permuted block that has a data distribution that better matches the assumptions underlying the design of the entropy coding process. At the decoder, the encoded data is decoded to recover a permuted block of quantized residual data. The decoder may then inverse permute the permuted block and dequantize the data to produce a block of reconstructed residual data. Advantageously, this approach avoids making any changes to the entropy coding process and uses the same scan pattern and coding procedure that would otherwise be used for encoding quantized transform domain coefficients.

It will be appreciated that the quantization (if uniform step size is used through the block) may be applied before or after permutation depending on the implementation. If the quantization varies based on position within the block, then the quantization may be applied after permutation to better match with expectations of statistical data distribution that may be built into the quantizer design. Likewise, in such a case the decoder dequantizes prior to inverse permutation.

Figure 3:
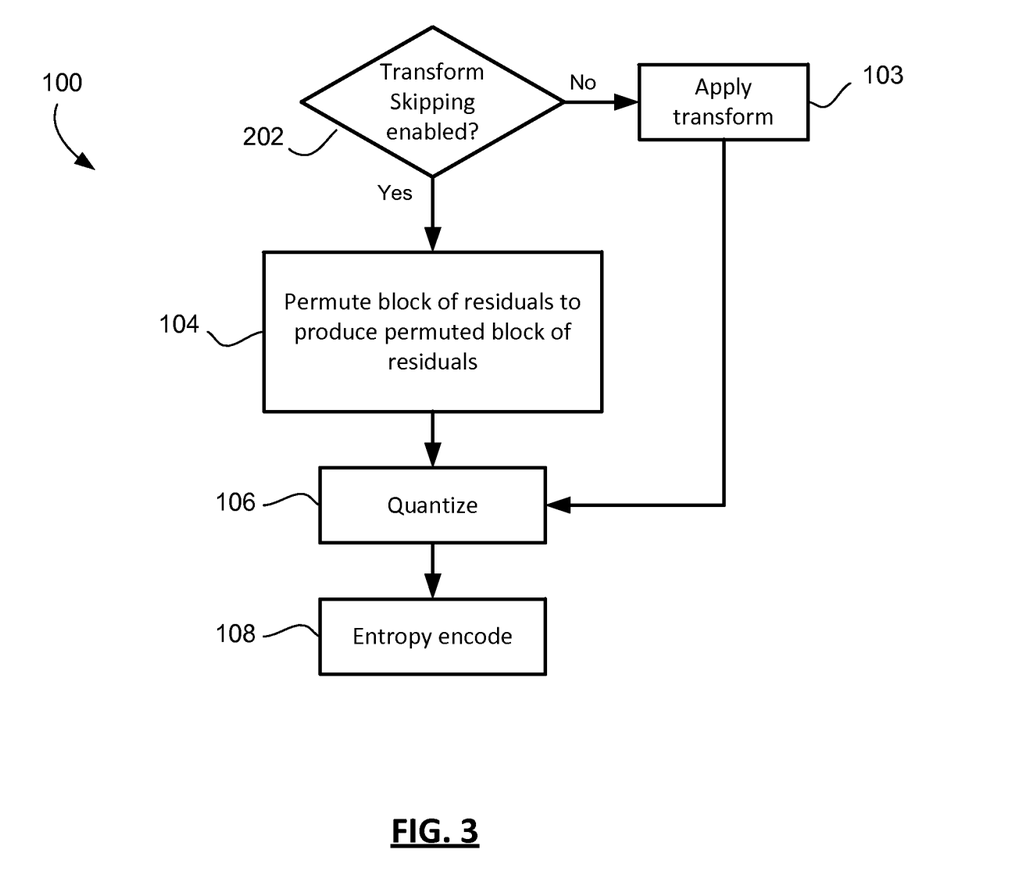
FIG. 3 shows a flowchart illustrating a process of encoding a block of residuals for which transform skipping is enabled.

Reference is now made to FIG. 3, which shows, in flowchart form, an example process 100 for encoding video data. The example process presumes that a prediction operation has occurred and that the video data has thus been reduced to blocks of residuals. This particular process 100 may be applied on a block-by-block basis (by transform unit, coefficient group, coding unit, or other block-basis). Note that the examples herein may make reference to square blocks but the present application is also applicable to non-square blocks, such as, for example, 2×8 or 8×2 transform units (although the specific permutation operation may be different than would be applied to a 4×4 block).

The process 100 includes the operation 102 of determining whether transform skipping is applied to this block. Transform skipping may only be enabled for certain types of blocks in some embodiments, such as intra-coded 4×4 blocks. The decision to transform skip may be made for an individual block using RD optimization, in some cases. The decision may be based on an overall setting for the video/picture/slice, in some cases. Irrespective of how it is determines whether to transform skip, in operation 102 the encoder routes the process 100 based on that determination. If transform skipping is not enabled, then the process 100 moves to operation 103 where the transform is applied. Then in operation 106 the transform coefficients are quantized. It will be understood that the transform and quantization operations may be implemented in a single operation in some implementations, but they are illustrated separately in this flowchart for clarity.

If transform skipping is enabled, then the encoder performs operation 104, 30 which involves permuting the block of residuals to produce a permuted block of residuals. The permutation is a one-to-one reordering of the residuals within the block. Each residual in the block is mapped to a respective position (the same position or a different position) in the permuted block. Examples of permutations include vertical inversion, where the rows of the block are rearranged such that the block's contents are flipped vertically, and horizontal inversion, where the columns of the block are rearranged such that the block's contents are flipped horizontally. Other examples include cyclic permutations, in which positions are adjusted in an ordered cycle. Yet another example permutation is rotation, where the block's contents are rotated by 90 degrees, 180 degrees or 270 degrees.

The permutation may be selected based on the extent to which the permutation tends to align the data distribution with the expected data distribution upon which the encoding process is based. In the case of transform skipping, the data distribution of the residuals results in concentration of non-zero values towards the bottom and/or right side of the block, whereas the coding model is based upon a concentration of non-zero values towards the upper and/or left side of the block. Accordingly, in one embodiment the permutation applied is a 180 degree rotation of the contents of the block.

The block of residuals may be a matrix an nW x·nH matrix x[i, j], where nW is the width of the block, nH is the height of the block, and where $0 \le i < nW$ and $0 \le j < nH$. The permuted matrix y[i,j] may be populated (generated) with the values of the x matrix in accordance with the following relation:

$$y[i,j] = x[nW-1-i, nH-1-j], \text{ where } 0 \le i < nW \text{ and } 0 \le j < Nh$$

Figure 5:
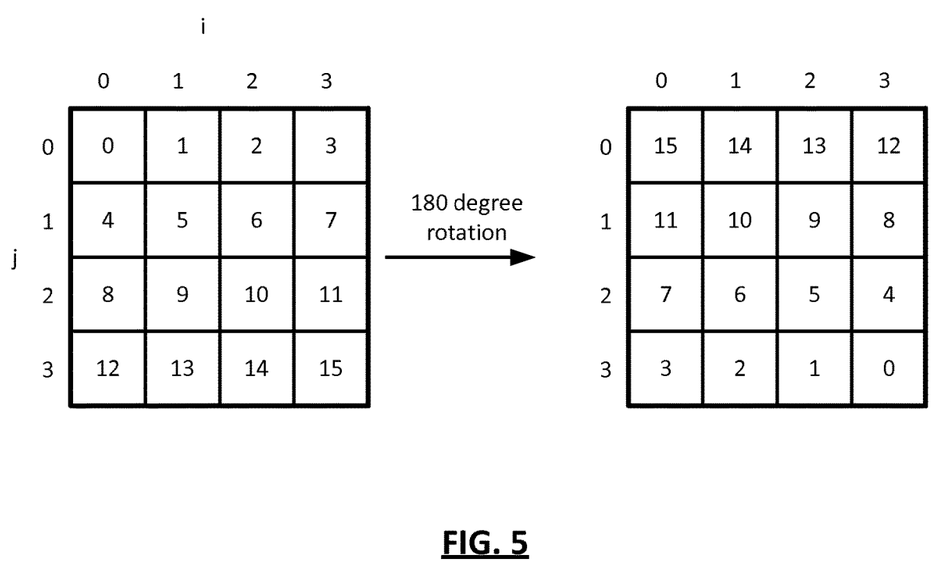
FIG. 5 shows an example permutation of a block of residuals.

FIG. 5 illustrates application of this permutation (a 180 degree rotation) to a 4×4 block. The numbering within the block of residuals, x, is an arbitrary horizontal numbering of residual positions. After permutation, the permuted block y shows the change in the positions of those residuals from the block x.

Referring still to FIG. 3, after permutation the permuted block of residuals y may be quantized (as noted above, in some implementations the quantization may occur before permutation) in operation 106. The quantized data is then entropy coded in operation 108.

Figure 4:
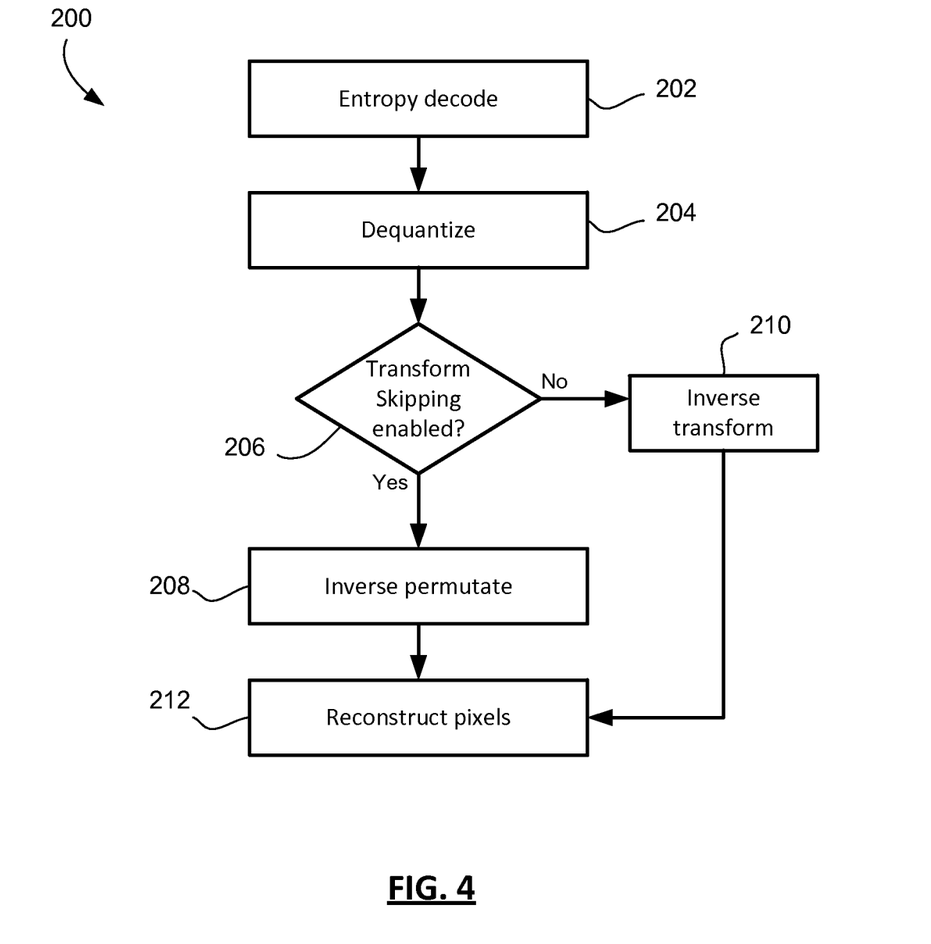
FIG. 4 shows a flowchart illustrating a process for decoding a block of residuals for which transform skipping is enabled.

Reference is now made to FIG. 4, which shows a process 200 for decoding encoded video data. Various operations in the process 200 are not illustrated in FIG. 4 for clarity and readability. The process 200 includes entropy decoding 202 the bitstream of encoded data to reconstruct quantized residuals/coefficients. It will be understood that the entropy decoding 202 involves decoding of various flags and additional information in a scan order in order to reconstruct the signed values of the residuals/coefficient in various positions within a block, such as a coefficient group, transform unit, coding unit, etc. That scan order (in this example embodiment) may be diagonal, horizontal, vertical or zig zag and generally begins with the lower-right position in the block and proceeds in its order until it reaches the upper left position in the block.

In operation 204, the reconstructed data is dequantized. The decoder determines, in operation 206, whether transform skipping is enabled for the current block. It may determine whether transform skipping is enabled based upon a flag decoded from the bitstream. The flag may be in a header, such as the picture header, slice header, coding unit header, or other headers applicable to the current block. The determination may take into account the nature of the current block and whether transform skipping is permitted based on the type of block. For example, transform skipping may be restricted to intra-coded blocks in some implementations. In other implementations, transform skipping may be restricted to intra-coded blocks of a particular size, such as 4×4 blocks.

If transform skipping is not enabled, then the decoder proceeds to perform the inverse transform in operation 210 to convert the block of reconstructed transform coefficients into a block of reconstructed residual data. It will be appreciated that the inverse transform operation 210 and the dequantization operation 204 are shown separately in this example for clarity although in some implementations these operations may be combined in a single mathematical operation upon the data.

If transform skipping is determined to be enabled in operation 206, then the decoder performs an inverse permutation upon the reconstructed residual data in operation 208. The inverse permutation reverses the permutation performed at the encoder. For example, if the encoder applies a 90 degree clockwise rotation, then the decoder applies a 90 degree counter-clockwise rotation. In another example, if the encoder applies a 180 degree rotation, then the decoder applies a 180 degree rotation. Thus the reconstructed residuals of the permuted block are rearranged to be put back into the positions they were in prior to permutation at the encoder. The decoder thereby produces a block of reconstructed residuals.

In one example, the 180 degree rotation is implemented by mapping the reconstructed residuals of the permuted block to new positions to produce the inverse permuted block. For example, where the permuted block has height nH and width nW, the inverse permutation includes mapping each $(i, j)$-th residual of the permuted block, for $0 \cdot ltoreq i < nW$ and $0 \cdot ltoreq j < nH$, to the $(nW-1-i, nH-1-j)$-th residual of the inverse permuted block.

In one embodiment, the inverse permutation performed in operation 206 depends on the scan order or the prediction mode. For example, with intra-prediction most prediction modes (horizontally from the left, diagonally from the upper-left, or vertically from above) result in data likely to be best aligned through a 180 degree rotation of the block. However, if the prediction mode is at least partly based on reference pixels to the upper right of the block (e.g. modes 3 and 7 in H.264/AVC), then the residual data may be most likely to be zero in the upper right corner of the block, and most likely to be non-zero in the lower left corner of the block. This situation may be better served though a permutation that is a 90 degree clockwise rotation and an inverse permutation that is a 90 degree counter-clockwise rotation.

Whether through inverse transform in operation 210 or inverse permutation in operation 210, the decoder generates a block of reconstructed residuals. In operation 212 those residuals are used to reconstruct the block of pixel data, such as through combining the reconstructed residuals with a predicted block obtained from intra-prediction or inter-prediction.

In some cases, the encoder and decoder may have a built-in scaling and descaling operation (in some cases, as part of a rounding process) into which the permutation may be added. For example, if transform skipping is enabled for a block, the residual sample value $r_{ij}$ with $i=0 \ldots (nW)-1$, $j=0 \ldots (nH)-1$ may be derived as follows:

If shift is greater than 0:

$$r_{(nW-1-i),(nH-1-j)} = (d_{ij} + (1 << (shift-1))) >> shift$$

Otherwise:

$$r_{(nW-1-i),(nH-1-j)} = d_{ij} << (-shift)$$

In these expressions $d_{ij}$ is a scaled dequantized reconstructed residual. The scaling is applied at the encoder and the decoder applies a descaling operation. The shift variable may be dependent upon text type (i.e. whether the values being reconstructed are luma or chroma). It will be noted that in both expressions above the scaled dequantized reconstructed residual are inverse permuted when the residual sample value is realized through the descaling/rounding operations.

In another embodiment, it might be preferred to perform the inverse permutation after entropy decoding and before inverse quantization, if applicable, at the video decoder. Correspondingly, the permutation might happen after quantization, if applicable, and before entropy coding at the video encoder.

In a further embodiment, the permutation and inverse permutation process can be used to reduce the number of scan orders used in the coding process at the encoder and the parsing process at the decoder, respectively. For example, if one block is to be horizontally (or vertically) scanned, and the diagonal scan is prescribed to be used in the coding and parsing process, one could permute the block so that the diagonal scan produces the same one dimensional sequence from the permuted block as the horizontal (or vertical) scan does from the block before permutation. In this way, the number of bins (binary symbols) to be coded or parsed for the concerned block in the case where only diagonal scan is used and permutation and inverse permutation are performed would be same as in the case where horizontal (or vertical) scan is used instead. At the decoder, after the permuted block is parsed (according to the prescribed diagonal scan), an inverse permutation is then applied to produce the reconstructed block that would be the same as if horizontal (or vertical) scan is used instead in the coding and parsing process. In another example, the permutation may be defined as the transpose so that either horizontal or vertical scan might be saved in the coding and parsing processes.

In order to improve compression performance when permutation and inverse permutation are used to reduce the number of scan orders, the contexts used to code and decode syntax elements related to a block (with or without transform/quantization) like significant-coefficient flags, significant-coefficient-group flags, and last significant coefficient positions, might depend upon the original scan order before permutation at the encoder, or equivalently after inverse permutation at the decoder.

In order to simplify the encoder or the decoder when permutation and inverse permutation are used to reduce the number of scan orders, permutation or inverse permutation might be performed as part of transform or inverse transform, respectively, or, in another implementation, the permutation or inverse permutation might be performed as part of scaling or inverse scaling processes, respectively.

The above-described processes employ a predetermined permutation and corresponding inverse permutation to better align the residual data with the expected data distribution upon which the entropy coding scheme has been based. This technique for aligning the residual data of a block with assumed data distributions can be generalized beyond a fixed permutation. For example, in one embodiment, a confidence level may be obtained either online during the coding process or offline by training for each position in a transform unit: the higher the confidence level is, the more likely the prediction is accurate. For example, in intra prediction the positions closer to the samples used for prediction (e.g. near the top-left boundary) have higher confidence levels than the positions farther away. Such confidence levels for a transform unit are collectively called the prediction confidence map for the transform unit. One way to derive such a confidence map is to use the minimum L1 or L2 distance between the position to be predicted and to the positions of the samples used for prediction. Another way to derive such a confidence map in inter prediction is to use the energy of the residuals in the (neighboring) prediction or transform units that have already been parsed, or statistics learned from the previously reconstructed slices of the same slice type. Other techniques may also be used to assess the confidence level of a prediction and build a prediction confidence map.

With the prediction confidence map and a prescribed scanning/coding order (e.g. zig-zag, horizontal, vertical, or diagonal), a reordering may then be generated or selected that attempts to place the positions with higher confidence level closer to the beginning of the scanning/coding order than the positions with lower confidence level. This dynamic generation of a custom reordering may be used in intra and inter coding, including in non-square blocks.

In some cases, a lossless mode can be achieved by skipping the transform and using flat quantization. The reordering of the coefficients may be performed in such a lossless mode. In one example embodiment, the reordering operation may be conditional on the usage of a flat quantization; that is, the reordering could be performed only in the case of lossless coding (i.e. skip transform and flat quantization). Alternatively, the reordering may be performed only in lossy coding (i.e. skip transform and non-flat quantization). In another embodiment, the reordering may be applied whenever the transform operation is skipped, irrespective of whether the quantization is flat or non-flat.

In another embodiment, setting the QP to a particular value (e.g. to zero) may correspond to performing a skip of the transform and the quantization steps. The reordering of the coefficients may be performed based on the QP value being set to that particular value.

In another case, the lossless mode is achieved by skipping both the transform and the quantization steps. The reordering of the coefficients may be implemented conditional on a flag that signals this lossless mode, whether it is applied at the frame, slice, CU level or at any other suitable level. For example, if lossless mode is enabled for a block, the residual sample values $r_{ij}$ with i=0 ... (nW)−1, j=0 ... (nH)−1 of the (nW)×(nH) array r may be derived from the (nW)×(nH) array of transform coefficients transCoeffLevel[xT][yT][cIdx] as follows:

$$r_{ij} = \text{transCoeffLevel}[xT][yT][cIdx][(nW)-1-I][(nH)-1-j]$$

In some scenarios, a frame can be divided in two areas, for instance one being used for screen content and the other for natural video. This may sometimes be called a split screen. Similarly, in a multiview codec, could utilize one view for screen content and the other for natural video. Alternatively, a bitstream could be composed of at least two substreams one making use of a transform skip or lossless mode, while the other would not. In any of these example situations, it will be understood that the coefficient reordering may be applied in the encoding/decoding of one of the views/areas/streams that is using either the transform skip, the transform skip with flat quantization or a skip of the transform and quantization steps while the other area/view/stream may not have coefficient reordering applied to its encoding/decoding.

In the case of scalable video coding, any of the foregoing embodiments may be applied to the base layer encoding/decoding, the enhancement layer encoding/decoding, or both layers. In the case of 3D or multi-view video coding, any of the forgoing embodiments may be applied to one of the view encoding/decoding, to the other view(s) encoding/decoding or to both/all views.

Figure 6:
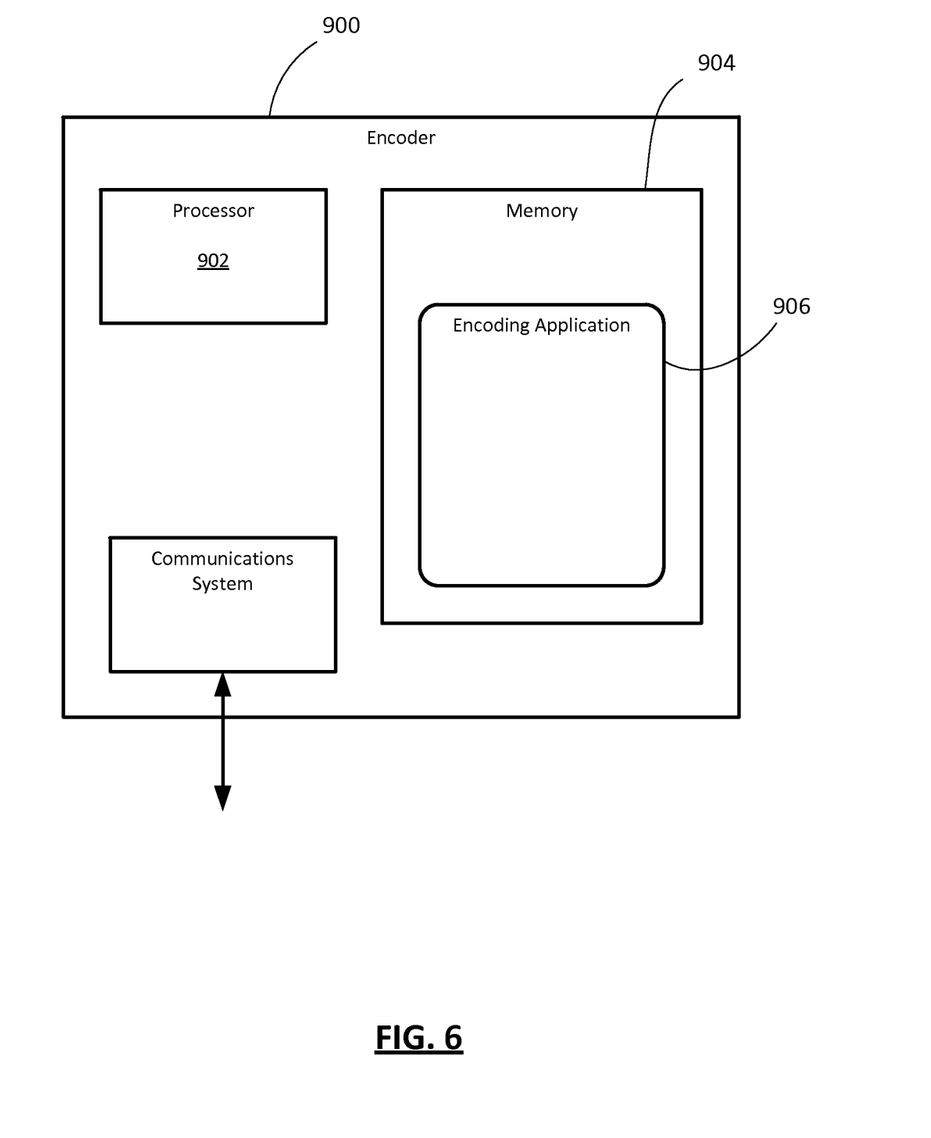
FIG. 6 shows a simplified block diagram of an example embodiment of an encoder.

Reference is now made to FIG. 10, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform operations such as those described herein. For example, the encoding application 906 may encode and output bitstreams encoded in accordance with the processes described herein. It will be understood that the encoding application 906 may be stored in on a computer readable medium, such as a compact disc, flash memory device, random access memory, hard drive, etc.

Figure 7:
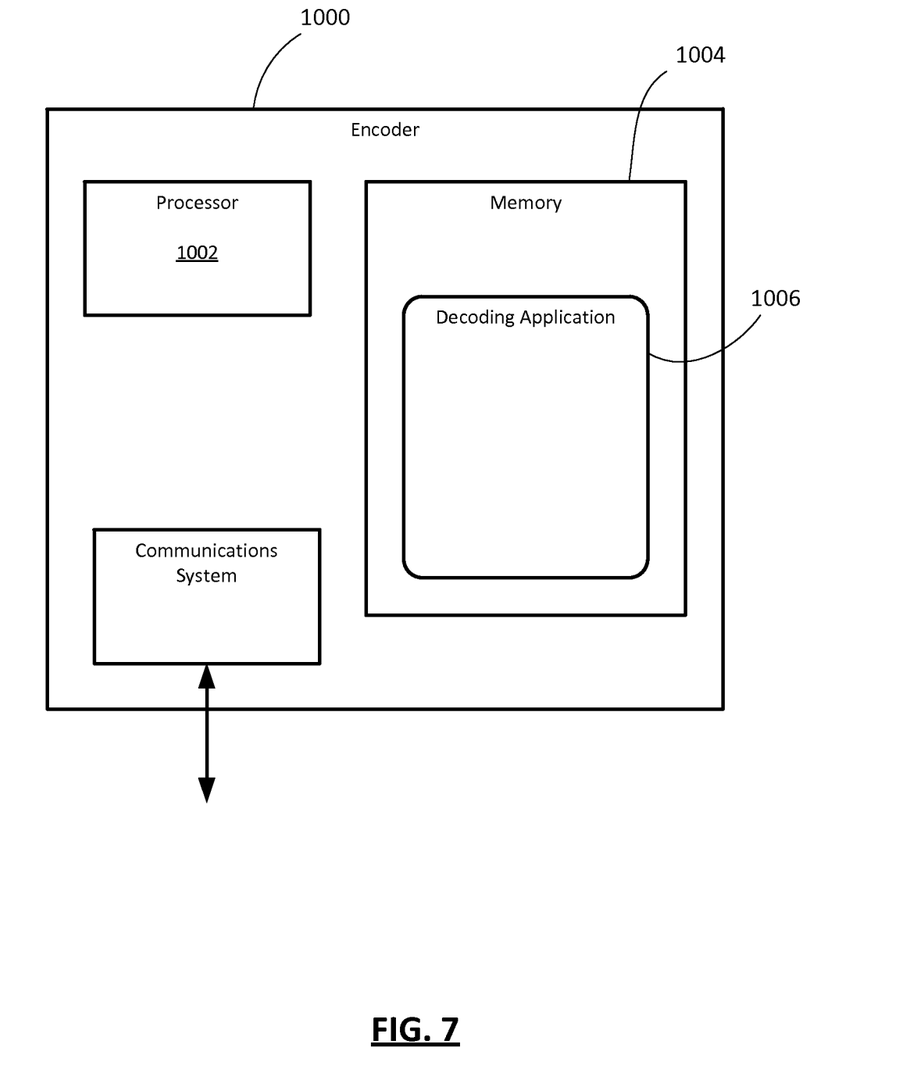
FIG. 7 shows a simplified block diagram of an example embodiment of a decoder.

Reference is now also made to FIG. 11, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform operations such as those described herein. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably-programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

The invention claimed is:

1. A method of encoding a coding unit, the method comprising:
   determining whether or not the coding unit is to be encoded using a lossless mode in which transform and quantization are bypassed during encoding of the coding unit;
   encoding a transquantbypass flag into a bitstream, wherein the transquantbypass flag is set based on the determination of whether or not the coding unit is to be encoded using the lossless mode; and
   when it is determined that the coding unit is to be encoded using the lossless mode:
   rotating a block of residuals for the coding unit; and
   encoding, based on a scan order, the rotated block of residuals for the coding unit using the lossless mode by bypassing the transform and quantization.

2. The method of claim 1, wherein the transquantbypass flag is encoded into the bitstream at a coding unit level.

3. The method of claim 1, wherein the rotating comprises rotating by 180 degrees.

4. The method of claim 1, wherein the scan order is one of a horizontal, vertical, zigzag, or diagonal scan order.

5. A encoding apparatus for encoding a coding unit, the encoding apparatus comprising:
   a processor; and
   a memory storing instructions, which when executed by the processor cause the encoding apparatus to:
   determine whether or not the coding unit is to be encoded using a lossless mode in which transform and quantization are bypassed during encoding of the coding unit;
   encode a transquantbypass flag into a bitstream, wherein the transquantbypass flag is set based on the determination of whether or not the coding unit is to be encoded using the lossless mode; and
   when it is determined that the coding unit is to be encoded using the lossless mode:
   rotate a block of residuals for the coding unit; and
   encode, based on a scan order, the rotated block of residuals for the coding unit using the lossless mode by bypassing the transform and quantization.

6. The encoding apparatus of claim 5, wherein the transquantbypass flag is encoded into the bitstream at a coding unit level.

7. The encoding apparatus of claim 5, wherein the rotating comprises rotating by 180 degrees.

8. The encoding apparatus of claim 5, wherein the scan order is one of a horizontal, vertical, zigzag, or diagonal scan order.

9. A non-transitory computer readable medium comprising instructions for decoding a coding unit from a bitstream, said instructions, when executed by a processor, cause the processor to perform the steps of:
   determining whether or not the coding unit is to be encoded using a lossless mode in which transform and quantization are bypassed during encoding of the coding unit;
   encoding a transquantbypass flag into a bitstream, wherein the transquantbypass flag is set based on the determination of whether or not the coding unit is to be encoded using the lossless mode; and
   when it is determined that the coding unit is to be encoded using the lossless mode:
   rotating a block of residuals for the coding unit; and
   encoding, based on a scan order, the rotated block of residuals for the coding unit using the lossless mode by bypassing the transform and quantization.

10. The non-transitory computer readable medium of claim 9, wherein the transquantbypass flag is encoded into the bitstream at a coding unit level.

11. The non-transitory computer readable medium of claim 9, wherein the rotating comprises rotating by 180 degrees.

12. The non-transitory computer readable medium of claim 9, wherein the scan order is one of a horizontal, vertical, zigzag, or diagonal scan order.

* * * * *